Jan. 2, 1968     T. E. LOHR     3,361,404
SUNSHADE ASSEMBLY
Filed March 23, 1966
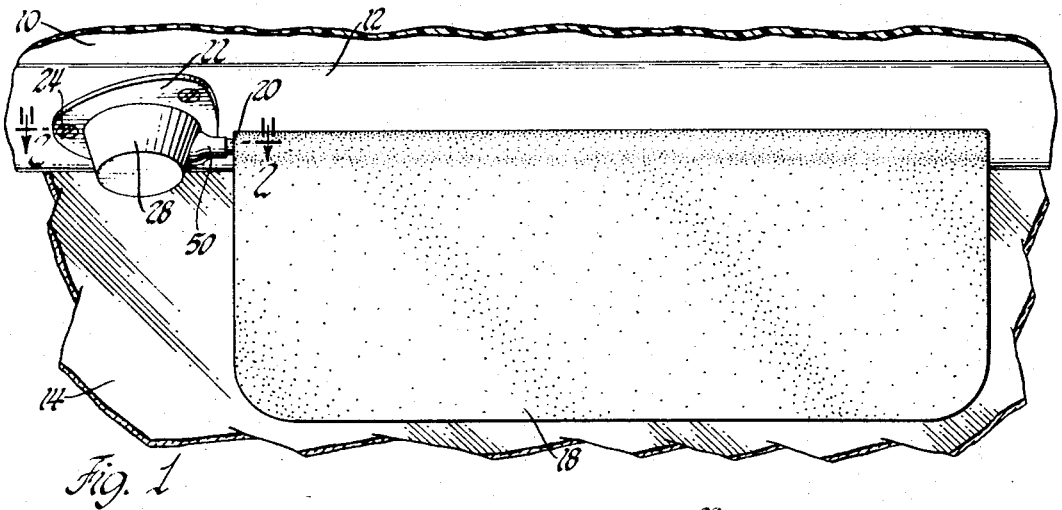
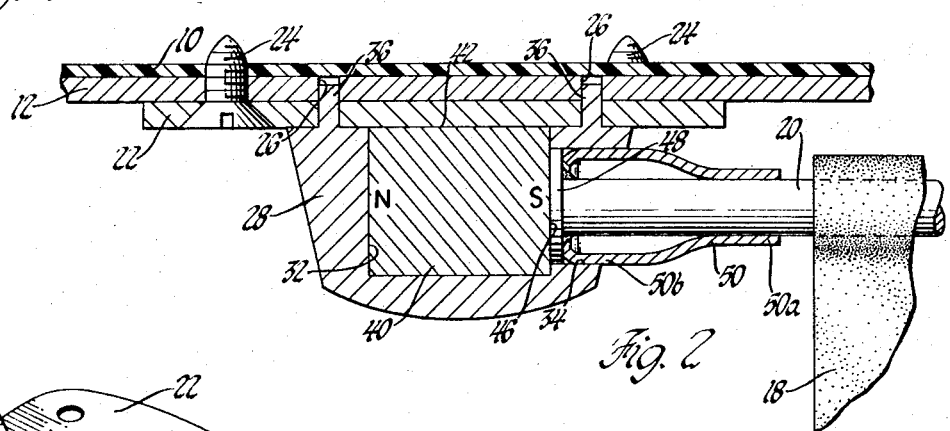
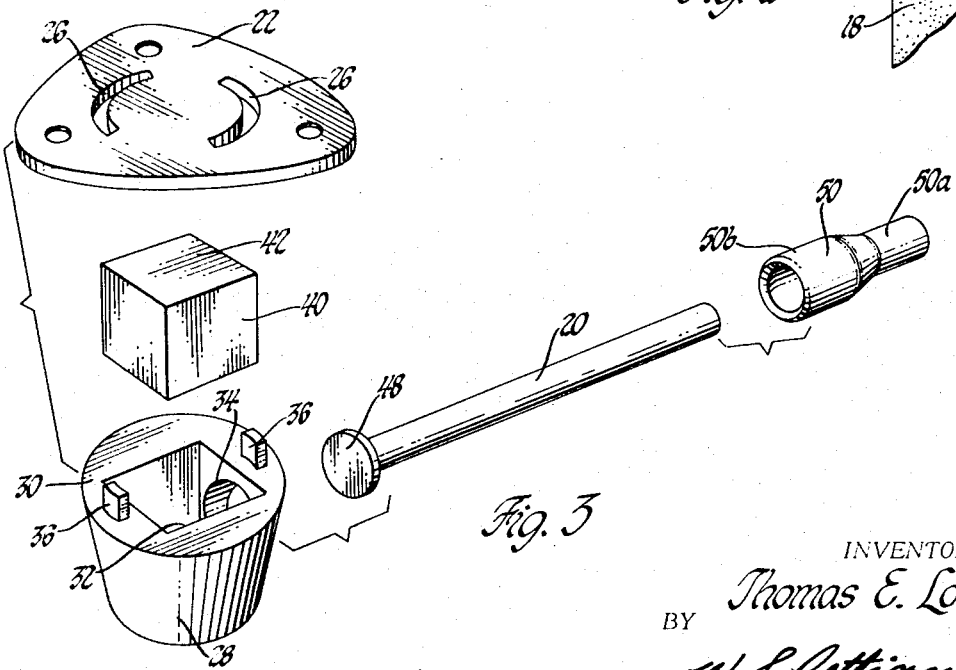
INVENTOR.
Thomas E. Lohr
BY
W. S. Pettigrew
ATTORNEY United States Patent Office 3,361,404
Patented Jan. 2, 1968

3,361,404
SUNSHADE ASSEMBLY
Thomas E. Lohr, Warren, Mich., assignor to General Motors Corporation, Detroit, Mich., a corporation of Delaware
Filed Mar. 23, 1966, Ser. No. 536,711
7 Claims. (Cl. 248—206)

ABSTRACT OF THE DISCLOSURE

A sunshade support assembly includes a flat plate secured to the vehicle body and provided with a pair of arcuate slots. The plate is of ferromagnetic material. A magnet is fitted within a housing and has a first pivot surface flush with the surface of the housing and between the opposite magnetic poles thereof. This surface magnetically engages the surface of the plate and lugs on the housing fit in the slots of the plate to limit pivotal movement of the magnet and housing relative to the plate. The housing includes an opening at one of the poles of the magnet and a ferromagnetic base on the support rod fits within the opening and engages the one pole face of the magnet to mount the support rod and the sunshade on the body. A ferro on the support rod helps in supporting this rod within the housing opening.

Specification

This invention relates to a support assembly and, more particularly, to a magnetic sunshade support assembly for use in a vehicle.

One feature of the invention is that it provides an improved magnetic support assembly. A further feature of the invention is that it provides a support assembly including a magnet having two movable support surfaces, the magnetic engagement at one support surface being through a closed magnetic circuit and the magnetic engagement at the other support surface being through an open magnetic circuit. Still another feature of the invention is that it provides a uspport assembly comprising a ferromagnetic support member, a ferromagnetic supported member, and a permanent magnet having a first pivot surface between opposite magnetic poles thereof and a second pivot surface at one pole face, the support member being adapted to be held magnetically in pivotal engagement with the first pivot surface through a closed magnetic circuit and the supported member being adapted to be held magnetically in pivotal engagement with the second pivot surface through an open magnetic circuit.

Other features and advantages of the invention will be apparent from the following specification and drawings in which:

FIGURE 1 is a fragmentary elevation of a portion of the inside of an automobile body incorporating the improved sunshade support assembly;

FIGURE 2 is an enlarged section taken along the line 2—2 of FIGURE 1; and

FIGURE 3 is an exploded isometric view of the improved support assembly.

In an automobile, it is conventional to mount a sunshade adjacent the windshield in front of the driver's seat, the sunshade being pivotal about the axis of its support rod between a raised out-of-the-way location and lowered operative locations. Preferably, the sunshade is also pivotal about a transverse, generally horizontal axis from a front position where it operates in conjunction with the windshield to a side position where it operates in conjunction with a side window. Preferably, the sunshade support is so arranged that the first above-describbed pivotal movement of the sunshade about the axis of its support rod requires less force to accomplish than does the second-described pivotal movement about a transverse axis. Generally, in the past, the sunshade support assembly has included frictional clamping means so that the sunshade is frictionally held in any preselected position and may be moved against the frictional force exerted by the clamping means to a desired operating position. If the clamping means becomes loose, the sunshade will not remain in position.

This invention provides an improved magnetic sunshade assembly which incorporates all the features and advantages above-described in connection with frictionally clamped support assemblies, but which has no friction clamping means or similar devices to become loose through wear or vibration.

Referring now more particularly to the drawings, FIGURE 1 illustrates a portion of the interior of an automoble body, the reference character 10 representing the roof and the reference character 12 indicating a conventional garnish molding or header bar extending transversely across the vehicle body above the top of the windshield 14, being mounted on the lower front edge of the roof 10.

A sunshade 18 is fixedly mounted on a sunshade support rod 20, which is mounted for pivotal movement about its axis in a manner later to be described, so that the sunshade may be pivoted between lower operative locations, as illustrated in FIGURE 1, and an inoperative location wherein the free edge of the sunshade lies adjacent the roof 10 of the automobile. The support assembly for mounting the sunshade is shown best in FIGURES 2 and 3. It comprises a support bracket 22 which may be mounted by screws 24 to the header bar 12. The support bracket is made of a ferromagnetic material, as steel, and is formed with a pair of arcuate guide slots 26. The lower surface of the bracket 22, between the slots 26, forms a pivot surface. A magnet housing 28, which preferably is made of nonmagnetic material, as plastic or zinc, is formed with a base surface 30 having a magnet receiving cavity 32 therein with a transverse bore 34 opening from a side of the housing into the cavity 32. A pair of lugs 36 project from the base surface 30 on opposite sides of the cavity 32 and are so formed that they may be received in the respective arcuate slots 26 when the housing member 28 is mounted in its operative position to permit limited pivotal movement of the housing 28 on the support bracket 22.

A permanent magnet 40 is formed to seat within the cavity 32 so that one pole (the south-seeking pole as illustrated) lies adjacent the bore 34 in the housing and the other pole (the north-seeking pole as illustrated) lies adjacent the opposite wall of the cavity 32, whereby the magnet 40 has a first pivot surface 42 of substantial area between the opposite magnetic poles of the magnet and a second pivot surface 46 (FIGURE 2) at one pole face of the magnet and adjacent the opening of the bore 34 into the cavity 32. A ferromagnetic washer stud 48, preferably of steel, is secured as by welding to the end of the sunshade support rod 20 and, as shown in FIGURE 2, this washer is of such a diameter that it fits closely within the bore 34. A ferrule 50 is mounted on the sunshade support rod 20, said ferrule having a reduced portion 50a at one end fitting closely over the sunshade support rod and enlarged portion 50b at the other end having an external diameter equal to the diameter of bore 34 for providing a bearing surface complementary to the bearing surface formed by bore 34.

The device is assembled by mounting the support bracket 22 on the header 12 by means of the screws 24, inserting the magnet 40 into the cavity 32 with one pole of the magnet facing the housing bore 34 and the other pole facing the opposite wall of the cavity 32. The rod 20 and ferrule 50 are then inserted in the bore 34 so that the base pivot surface of the washer 48 engages the pivot surface of the magnet adjacent its pole face. The subassembly comprising the sunshade support rod 20, housing 28, and magnet 40 may then be magnetically attached to the support bracket 22, the lugs 36 entering the slots 26 to guide and limit pivotal movement between the support bracket and the magnet subassembly. When mounted, the pivot surface 30 on the magnet engages the complementary pivot surface of the bracket 22 and is magnetically held in pivotal engagement therewith through a closed magnetic circuit which is completed between the poles of the magnet through the ferromagnetic material of the support bracket. On the other hand, the washer 48 is magnetically held in pivotal engagement with the pivot surface at the pole face of the magnet through an open or air magnetic circuit. Consequently, less force is required to pivot the sunshade support rod 20 about its axis than is required to pivot the entire subassembly on the support bracket 22, thus providing the same operating feel that is provided in a conventional mechanical friction sunshade support. If desired, the support bracket 22 may be eliminated, and the magnet 28 may directly engage the header bar 12, which, in such arrangement, should be made of ferromagnetic material.

While I have shown and described one embodiment of my invention, it is capable of many modifications. Changes, therefore, in the construction and arrangement may be made without departing from the spirit and scope of the invention as set forth in the appended claims.

I claim:

1. In a vehicle, a sunshade assembly, comprising: a permanent magnet having a first pivot surface of substantial area between opposite magnetic poles thereof and a second pivot surface at one pole face; a ferromagnetic support having a pivot surface complementary to said first pivot surface and magnetically held in pivotal engagement therewith through a closed magnetic circuit; a sunshade support rod having a ferromagnetic base with a surface magnetically held in pivotal engagement with said second pivot surface through an open magnetic circuit; and a sunshade member mounted on said support rod for movement with the rod relative to the second pivot surface, the sunshade member, the support rod and the magnet being movable as a unit relative to the pivot surface of the ferromagnetic support.

2. Apparatus of the character claimed in claim 1, including cooperating lug and slot means on said magnet and said ferromagnetic support to limit the extent of pivotal movement between said magnet and said support.

3. Apparatus of the character claimed in claim 1, including a member housing said magnet and providing a bearing surface for said sunshade supporting rod.

4. Apparatus of the character claimed in claim 3, including a ferrule mounted on said sunshade supporting rod and having a bearing surface complementary to the bearing surface of said housing.

5. A support assembly comprising, in combination, a permanent magnet having a first pivot surface between opposite magnetic poles thereof and a second pivot surface at one pole, a first ferromagnetic member having a pivot surface complementary to the first magnet pivot surface and magnetically held in pivotal engagement therewith through a closed magnetic circuit to pivotally interconnect the magnet and the first member, a second ferromagnetic member having a pivot surface complementary to the second magnet pivot surface and magnetically held in pivotal engagement therewith through an open magnetic circuit to pivotally interconnect the second member and the magnet, and means mounting one of the members on a support to mount the magnet and other member on the support for selective pivotal movement as a unit relative to the one member and selective pivotal movement of the other member relative to the one member and the magnet.

6. A support assembly as recited in claim 5 including means limiting the extent of pivotal movement between the magnet and the one member.

7. The combination recited in claim 5 including a housing for the magnet and having openings therein to the first and second pivot surfaces of the magnet, and cooperating means on the magnet adjacent one of the openings to provide a bearing surface for one of the ferromagnetic members.

References Cited

UNITED STATES PATENTS

| | | | |
|---|---|---|---|
| 2,207,668 | 7/1940 | Hudgings. | |
| 2,305,584 | 12/1942 | Arbron | 248—278 |
| 2,424,222 | 7/1947 | Brown et al. | 248—278 |
| 2,454,613 | 11/1948 | Peltier et al. | 248—278 X |
| 2,802,693 | 8/1957 | Lauve | 248—206 X |

JOHN PETO, *Primary Examiner.*

R. P. SEITTER, *Assistant Examiner.*